(No Model.)
S. J. SCHACK.
STOCKING SUPPORTER.
No. 367,448. Patented Aug. 2, 1887.
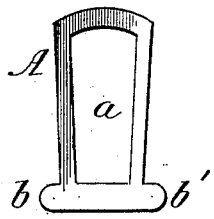
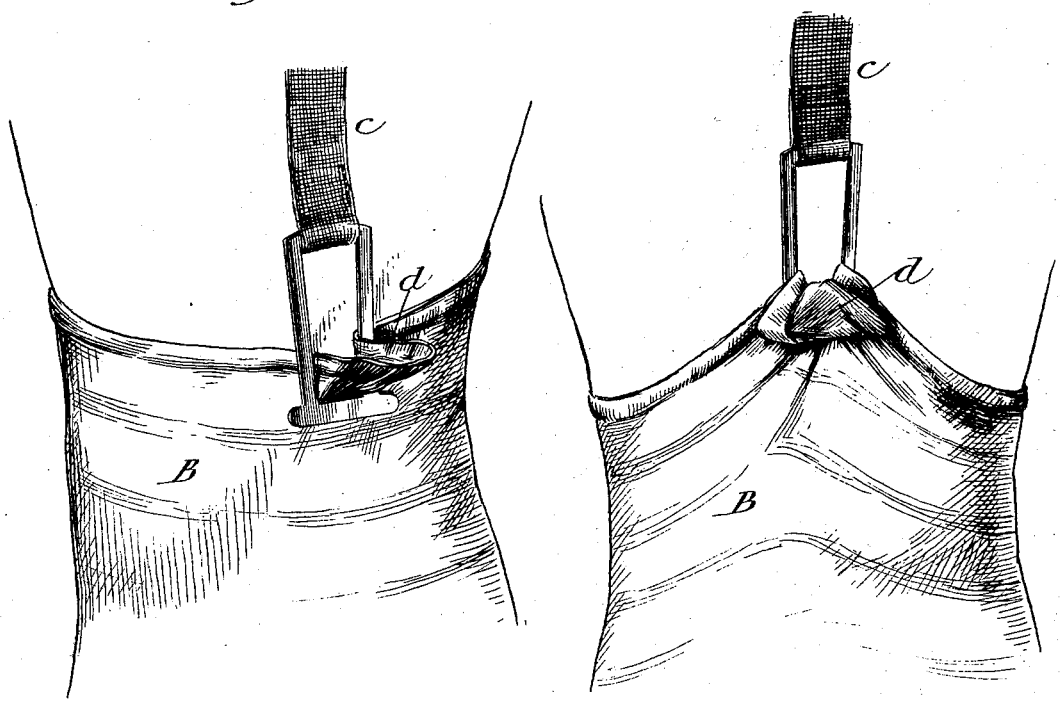
Witnesses:
O. W. Bond
Albert H. Adams
Inventor:
Sarah J. Schack

UNITED STATES PATENT OFFICE.

SARAH J. SCHACK, OF CHICAGO, ILLINOIS.

STOCKING-SUPPORTER.

SPECIFICATION forming part of Letters Patent No. 367,448, dated August 2, 1887.

Application filed May 24, 1887. Serial No. 239,262. (No model.)

*To all whom it may concern:*

Be it known that I, SARAH J. SCHACK, residing at Chicago, in the county of Cook and State of Illinois, and a citizen of the United States, have invented a new and useful Improvement in Stocking-Supporters, of which the following is a specification, reference being had to the accompanying drawings, in which—

Figure 1 is a front elevation. Figs. 2 and 3 illustrate the manner of using the supporter, which in these figures is shown in perspective.

The leading object of my invention is to provide a cheap and efficient stocking-supporter, which can be easily used, and the use of which will not materially injure the stocking, which I accomplish as illustrated in the drawings, and hereinafter fully described.

That which I claim as new will be pointed out in the claim.

In the drawings, A represents my stocking-supporter, which may most easily be made from sheet metal. Its distinguishing features are a large central opening, $a$, and two lateral projections, $b\ b'$, at the lower end.

$c$, Figs. 2 and 3, represents an elastic strap secured to the upper end of the supporter. B (in the same figures) represents a stocking. In use the upper end of the strap $c$ is to be secured as desired. The stocking can be securely connected with the supporter by first passing a portion, $d$, of the upper edge of the stocking through the opening $a$ in the supporter, as shown in Fig. 2, and then hooking such portion $d$ over the two projections $b\ b'$ at the lower end of the supporter, as shown in Fig. 3, when the stocking will be securely held by the downward pull thereon. The stocking can be very readily released from the supporter by detaching the part $d$ from the projections $b\ b'$.

The stockings will not be torn or materially injured by the use of this supporter.

The supporter of course can be used for other analogous purposes.

I do not claim as my invention the construction shown and described in Letters Patent of the United States to Thomas White, No. 291,252, dated January 1, 1884, nor that shown and described in Letters Patent of the United States to Rodney S Willard, No. 356,861, dated February 1, 1887.

What I claim as new, and desire to secure by Letters Patent, is—

A stocking-supporter, A, provided with a large central opening, $a$, and with two lateral projections, $b\ b'$, at the lower end and on opposite sides thereof, as shown and described, and for the purpose specified.

SARAH J. SCHACK.

Witnesses:
O. W. BOND,
ALBERT H. ADAMS.